US 8,246,052 B1

(12) United States Patent
Marvel, III

(10) Patent No.: US 8,246,052 B1
(45) Date of Patent: Aug. 21, 2012

(54) BLADDER CONTAINMENT MECHANISM

(75) Inventor: Robert L. Marvel, III, Norman, OK (US)

(73) Assignee: GE Oil & Gas ESP, Inc., Oklahoma City, OK (US)

( * ) Notice: Subject to any disclaimer, the term of this patent is extended or adjusted under 35 U.S.C. 154(b) by 324 days.

(21) Appl. No.: 11/981,399

(22) Filed: Oct. 30, 2007

Related U.S. Application Data

(60) Provisional application No. 60/855,285, filed on Oct. 31, 2006.

(51) Int. Cl.
*E21B 33/127* (2006.01)
*F16L 33/16* (2006.01)
*F16J 15/46* (2006.01)
*F16J 15/48* (2006.01)

(52) U.S. Cl. ........ 277/331; 277/583; 277/605; 277/646; 92/205

(58) Field of Classification Search .............. 277/331, 277/583, 605, 645–646; 92/205
See application file for complete search history.

(56) References Cited

U.S. PATENT DOCUMENTS

| 3,103,235 | A | * | 9/1963 | Stringham, III | 138/97 |
| 3,173,486 | A | * | 3/1965 | Smith | 166/116 |
| 3,337,222 | A | * | 8/1967 | Smith et al. | 277/350 |
| 3,514,113 | A | * | 5/1970 | Weiswurm | 277/583 |
| 5,114,054 | A | * | 5/1992 | Watson | 222/389 |
| 5,746,112 | A | * | 5/1998 | Watson | 92/205 |
| 7,159,508 | B1 | * | 1/2007 | Birsner | 92/205 |

* cited by examiner

*Primary Examiner* — Vishal Patel
(74) *Attorney, Agent, or Firm* — Crowe & Dunlevy

(57) ABSTRACT

A downhole submersible pumping system includes a housing and a bag seal assembly. The bag seal assembly includes a seal bag and a fastening assembly. The fastening assembly is configured to exert a compressive force between inner and outer surfaces of a first end of the seal bag. The fastening assembly may include a first ring attached to the support tube, a second ring and a plurality of fastening members. The first ring may be configured for threaded engagement with the support tube. The second ring is configured for engagement with the first ring.

12 Claims, 10 Drawing Sheets

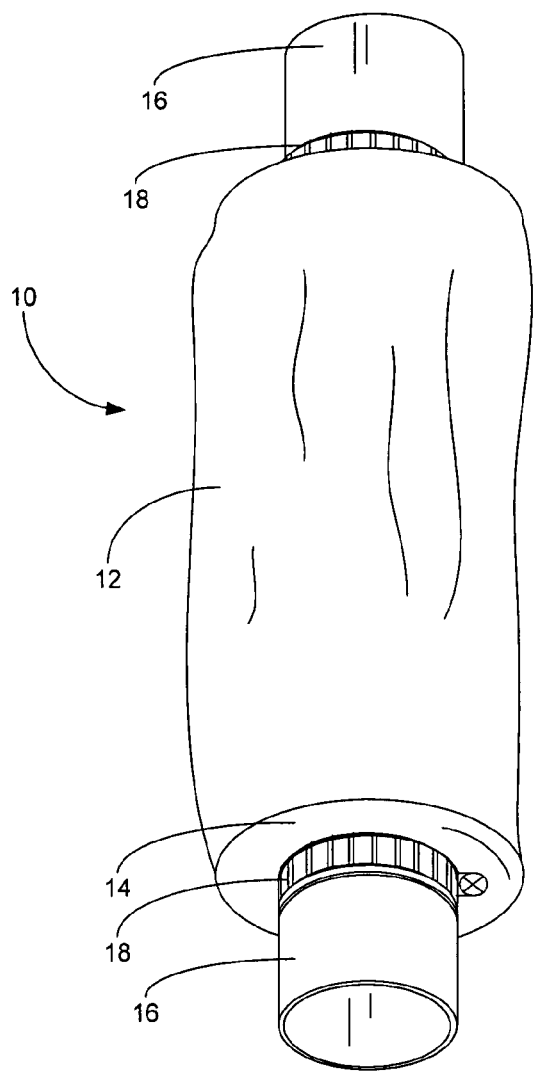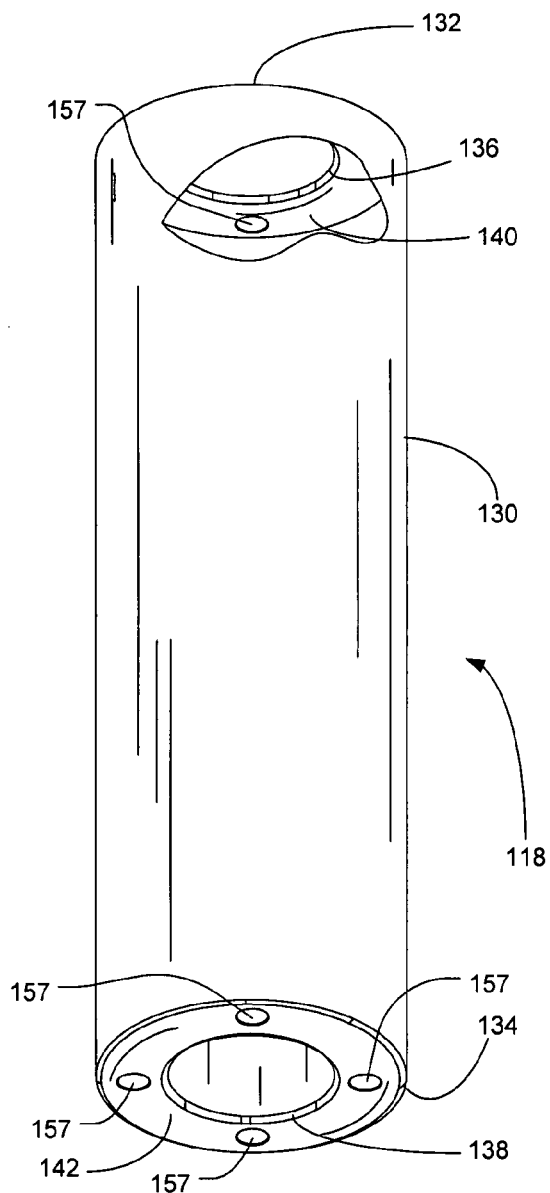
PRIOR ART
FIG. 1
FIG. 4

US 8,246,052 B1

BLADDER CONTAINMENT MECHANISM

RELATED APPLICATIONS

This application claims priority to U.S. Provisional Patent Application No. 60/855,285 entitled Improved Bladder Containment Method, filed Oct. 31, 2006, the disclosure of which is incorporated herein.

FIELD OF THE INVENTION

This invention relates generally to the field of submersible pumping systems, and more particularly, but not by way of limitation, to a seal section separation bag for use with a submersible pumping system.

BACKGROUND

Submersible pumping systems are often deployed into wells to recover petroleum fluids from subterranean reservoirs. Typically, the submersible pumping system includes a number of components, including one or more fluid filled electric motors coupled to one or more high performance pumps. Each of the components and sub-components in a submersible pumping system must be engineered to withstand the inhospitable downhole environment, which includes wide ranges of temperature, pressure and corrosive well fluids.

Components commonly referred to as "seal sections" protect the electric motors and are typically positioned between the motor and the pump. In this position, the seal section provides several functions, including transmitting torque between the motor and pump, restricting the flow of wellbore fluids into the motor, protecting the motor from axial thrust imparted by the pump, and accommodating the expansion and contraction of motor lubricant as the motor moves through thermal cycles during operation. Many seal sections employ seal bags to accommodate the volumetric changes and movement of fluid in the seal section. Seal bags can also be configured to provide a positive barrier between clean lubricant and contaminated wellbore fluid.

In the past, seal bags have been constructed by sliding an open-ended bag over cylindrical mounting blocks. As shown in the Prior Art drawing in FIG. 1, a prior art seal bag 10 includes a central portion 12 and two neck portions 14 (only one visible). The prior art seal bag 10 is installed over cylindrical mounting blocks 16 by fastening the open neck portions 14 to the cylindrical mounting blocks 16 with common hose clamps 18. This prior art design may be unsuitable in certain applications because the hose clamps 18 tend to shear the prior art seal bag 10 after repeated or extensive expansion. Furthermore, the necessity of the neck portions 14 in the prior art seal bag 10 decreases the available length and volume of the central portion 12. Additionally, the prior art design limits the use of inelastic bags due to their susceptibility of folding at the point of contact with the cylindrical mounting blocks 16.

There is therefore a need for an improved seal bag, seal sections and submersible pumping systems that overcome the deficiencies of the prior art. It is to this and other needs that the present invention is directed.

SUMMARY OF THE INVENTION

In a presently preferred embodiment, a seal section for use in a downhole submersible pumping system includes a housing and a bag seal assembly. The bag seal assembly preferably includes a seal bag and a fastening assembly. The fastening assembly secures a first end of the seal bag to form a suitable seal. The fastening assembly preferably includes a first ring, a second ring, and a plurality of fastening members. The first ring or second ring may be configured for threaded engagement with a support tube.

BRIEF DESCRIPTION OF THE DRAWINGS

FIG. 1 is a side perspective view of a PRIOR ART seal bag.

FIG. 4 is a side perspective partial cut-away view of the seal bag of FIG. 3.

DETAILED DESCRIPTION OF THE PREFERRED EMBODIMENTS

Figure 2:
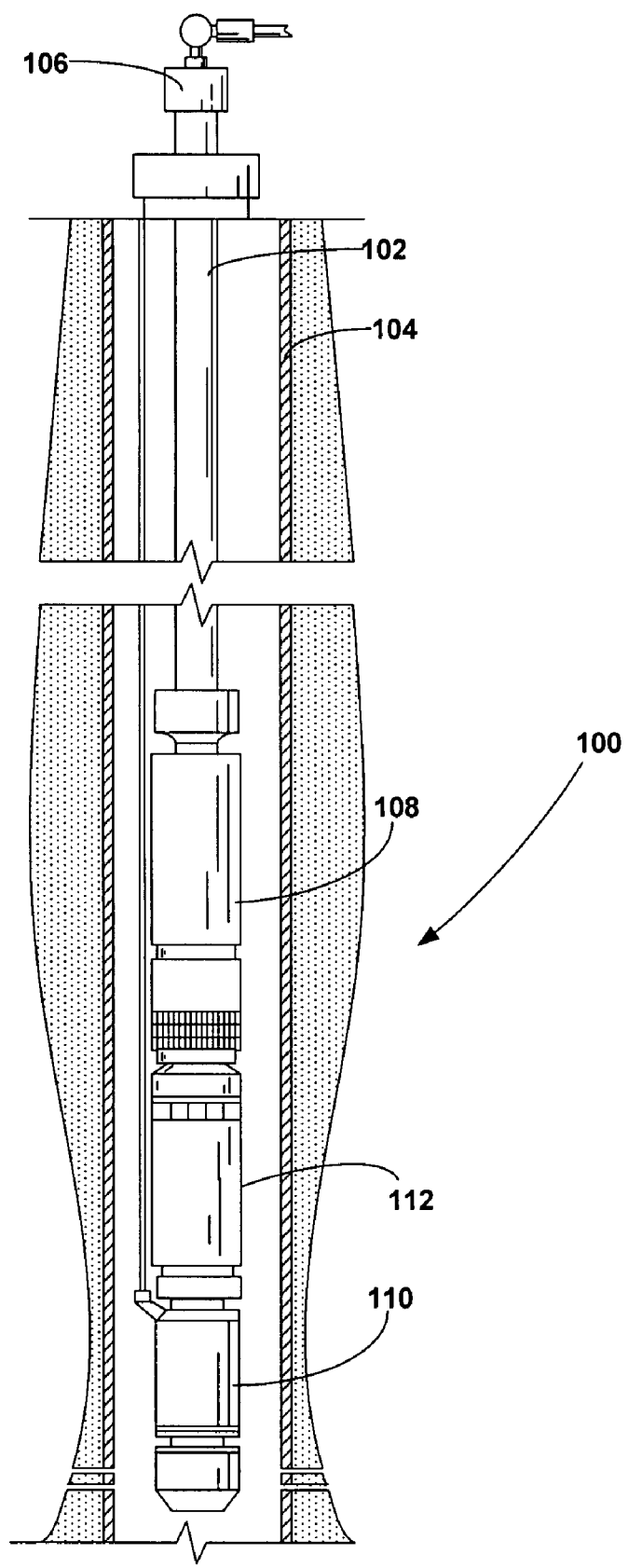
FIG. 2 is an elevational view of a submersible pumping system constructed in accordance with a presently preferred embodiment.

In accordance with a preferred embodiment of the present invention, FIG. 2 shows an elevational view of a pumping system 100 attached to production tubing 102. The pumping system 100 and production tubing 102 are disposed in a wellbore 104, which is drilled for the production of a fluid such as water or petroleum. As used herein, the term "petroleum" refers broadly to all mineral hydrocarbons, such as crude oil, gas and combinations of oil and gas. The production tubing 102 connects the pumping system 100 to a wellhead 106 located on the surface. Although the pumping system 100 is primarily designed to pump petroleum products, it will be understood that the present invention can also be used to move other fluids. It will also be understood that, although each of the components of the pumping system are primarily disclosed in a submersible application, some or all of these components can also be used in surface pumping operations.

The pumping system 100 preferably includes some combination of a pump assembly 108, a motor assembly 110 and a seal section 112. The motor assembly 110 is preferably an electrical motor that receives power from a surface-mounted motor control unit (not shown). When energized, the motor assembly 110 drives a shaft that causes the pump assembly 108 to operate. The seal section 112 shields the motor assembly 110 from mechanical thrust produced by the pump assembly 108 and provides for the expansion of motor lubricants during operation. The seal section 112 also isolates the motor assembly 110 from the wellbore fluids passing through the pump assembly 108. Although only one of each component is shown, it will be understood that more can be connected when appropriate. It may be desirable to use tandem-motor combinations, multiple seal sections, multiple pump assemblies or other downhole components not shown in FIG. 2.

Figure 3:
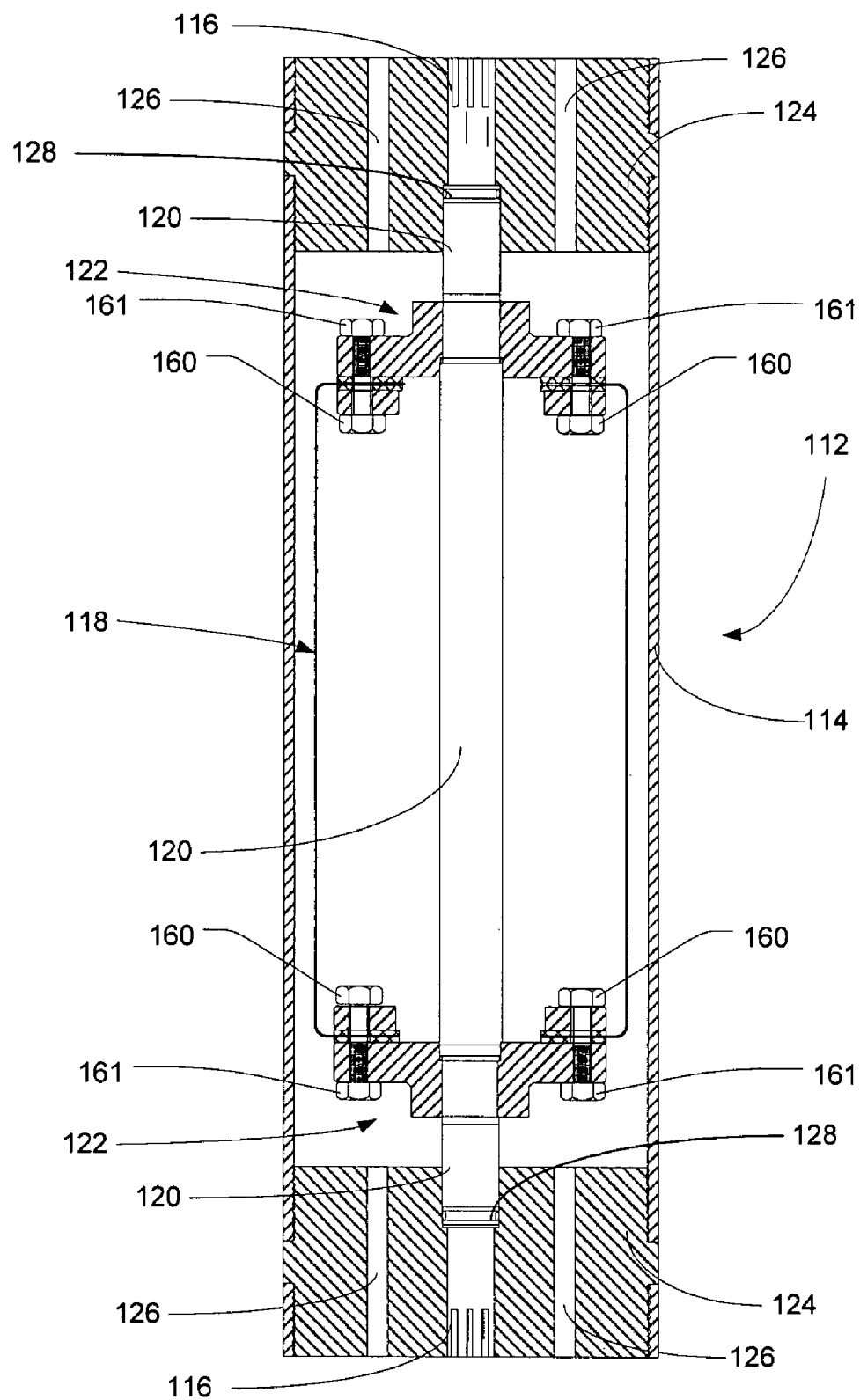
FIG. 3 is a cross-sectional view of a first preferred embodiment of a seal section for use with the submersible pumping system of FIG. 2.

Referring now to FIG. 3, shown therein is a cross-sectional view of the seal section 112. The seal section 112 includes a housing 114, a shaft 116, a seal bag 118, a support tube 120 and a pair of fastening assemblies 122. The seal bag 118 is configured to prevent the contamination of clean motor lubricants with wellbore fluids. The shaft 116 transfers mechanical energy from the motor assembly 110 to the pump assembly 108. The bag support tube 120 provides support for the seal bag 118 and shields the shaft 116 as it passes through the seal bag 118. The seal section 112 may also include bearing supports 124, a plurality of ports 126 and one or more o-ring seals 128. The o-ring seals 128 are located at various positions within the seal section 112 and limit the migration of fluid along the shaft 116. For the purposes of this disclosure and for the appended claims, the term "bag seal assembly" collectively refers to the fastening assemblies 122 and the seal bag 118, and their respective components. It will be understood that while FIG. 3 depicts the seal section 112 making use of two similar embodiments of the bag seal assembly, different embodiments of the invention may be paired together to meet specific application needs, i.e., the preferred embodiment depicted in FIG. 5 can be paired with the embodiments depicted in FIG. 6, FIG. 7, FIG. 8, FIG. 9 or FIG. 10 within the same seal section 112.

For purposes of illustration, the bag seal assembly is disclosed as contained within the seal section 112. It will be understood, however, that the bag seal assembly could be installed elsewhere in the pumping system 100. For example, it may be desirable to integrate the bag seal assembly within the motor assembly 110 or pump assembly 108.

Referring now to FIG. 4, shown therein is a side perspective view in partial cutaway of a preferred embodiment of the seal bag 118. The seal bag 118 preferably includes a central portion 130, a first end 132 and a second end 134. The seal bag 118 is substantially configured as an elongated cylinder with the first end 132 and second end 134 in a substantially perpendicular relationship to the central portion 130. The first end 132 includes a centrally disposed first end aperture 136 (visible in partial cut-away). The second end 134 includes a centrally disposed second end aperture 138. Each of the first and second ends 132, 134 includes an inner surface 140 and an outer surface 142.

In the preferred embodiment, the seal bag 118 is fabricated with a material that is resistant to degradation from exposure to wellbore substances. The first end aperture 132 and second end aperture 134 are preferably sized and configured to fit in close proximity with the outer diameter of the support tube 120 (as shown in FIG. 3). By comparing FIGS. 1 and 4, it can be seen that the seal bag 118 provides a larger internal capacity. This increased capacity is largely due to the configuration of the seal bag 118, which does not include the neck portions 14 that were used to secure the prior art seal bag 10 to the mounting blocks 16.

Figure 5:
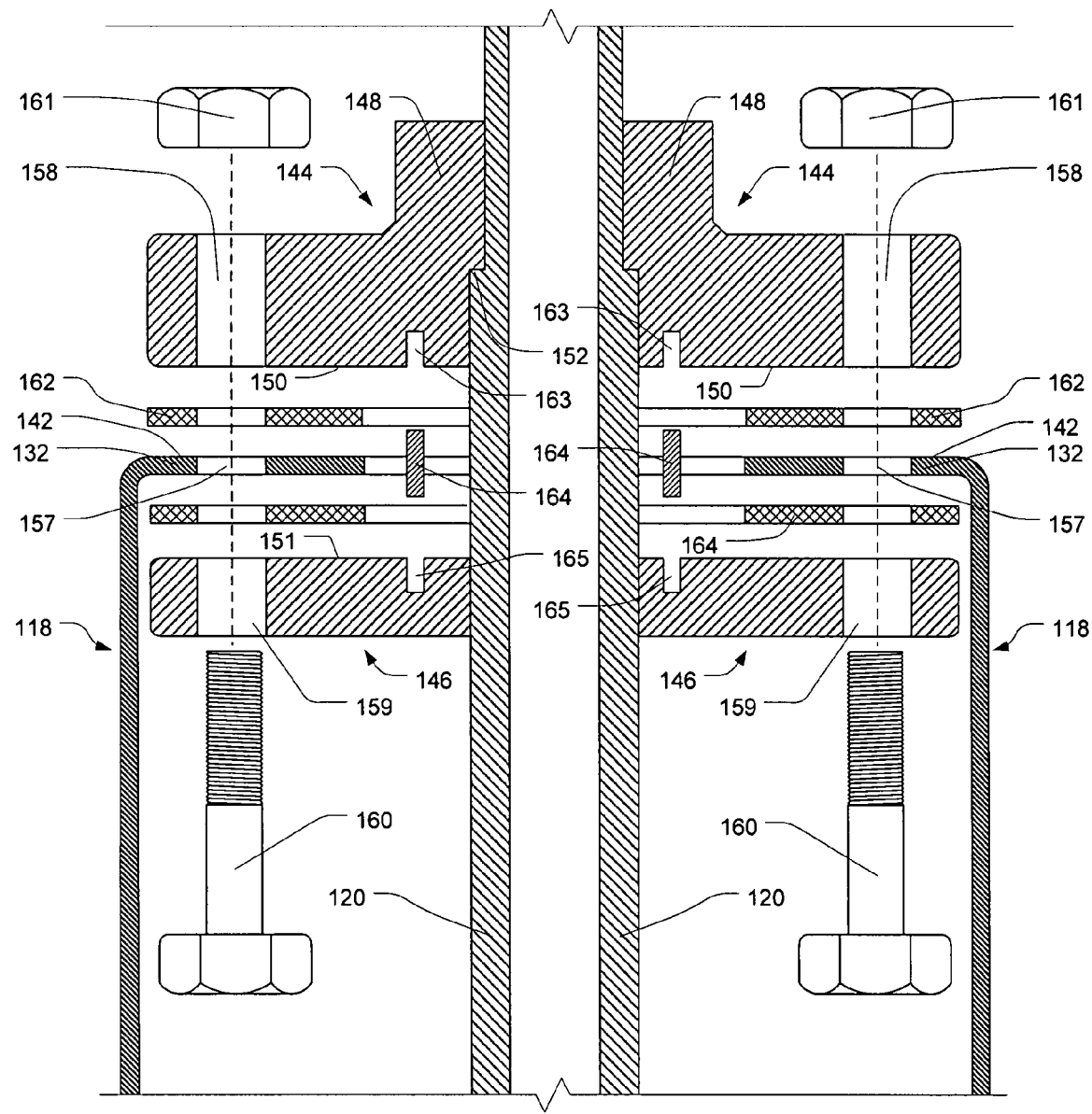
FIG. 5 is a side cross-sectional partial exploded view of the first preferred embodiment of the fastening assembly of the seal section of FIG. 3.

Turning now to FIG. 5, shown therein is a close-up, cross-sectional and exploded view of the engagement between the seal bag 118, the support tube 120 and one of the fastening assemblies 122. Although only one of each of these components is depicted in FIG. 5, it will be understood that the preferred embodiment makes use of similar components on the opposite end of the seal bag 118 (as shown in FIG. 3).

In the preferred embodiment, the fastening assembly 122 includes a first ring 144, a second ring 146 and a plurality of fastening members 160. The first ring 144 is preferably configured with cylindrical geometry and includes a central hub 148, a first ring load surface 150 extending radially from the central hub 148, and a plurality of first fastening bores 158 extending through the first ring load surface 150. The first ring 144 is also preferably configured to slide over the support tube 120. FIG. 5 depicts the first ring 144 engaged with a shoulder 152 located on the support tube 120. The second ring 146 is preferably configured with cylindrical geometry and includes a second ring load surface 151 and a plurality of second ring fastening bores 159 extending through the second ring load surface 151.

In the preferred method of installation, the second ring 146 is inserted into the interior of the seal bag 118 through the first end aperture 136. The second ring load surface 151 of the second ring 146 is placed in contact with the inner surface 140 of the first end 132 of the seal bag 118. The second ring 146 and seal bag 118 are then moved into position over the support tube 120. Once the second ring 146 and seal bag 118 are moved into position over the support tube 120, each of the plurality of fastening members 160 are inserted through both the second ring fastening bores 159 and the fastening holes 157. After proper insertion, each fastening member 160 protrudes through the outer surface 142. The first fastening bores 158 are then aligned to the protruding fastening members 160 and the first ring positioned over the support tube 120 and onto the outer surface 142. Because the plurality of fastening members 160 extend through the fastening holes 157, the fastening members 160 retain and align the first end 132 on the second ring 146 while the first ring 144 is installed.

In the preferred method of installation, a proper seal is made by applying a compressive force to the seal bag 118. The first ring 144 and second ring 146 are intended to provide a substantially uniform distribution of force across the first end 132 of the seal bag 118 thus providing an effective seal between the interior and exterior of the seal bag 118. In the preferred method of installation, the compressive force is applied by engaging the protruding plurality of fastening members 160 with a plurality of locking fasteners 161. The plurality of locking fasteners 161 can be engaged with the plurality of fastening members 160 such that the plurality of locking fasteners are adjacent to the first ring load surface 150. Once so engaged, tightening of the locking fasteners 161 applies a compressive force to the first ring 144 which cooperates with the second ring 146 to exert the compressive force on the first end 132 of the seal bag 118. After the first end 132 of the seal bag 118 has been secured with the fastening assembly 122, the second end 134 is secured following the same process.

Optionally, the fastening assembly 122 may include a plurality of dowel pins 164. Dowel pins 164 are inserted into a plurality of first ring dowel pin holes 163 in the first ring 144 and into a plurality of second ring dowel pin holes 165 in second ring 146, as depicted in FIG. 5. Dowel pins 164 are helpful in aligning the relative components within the fastening assembly 122 during installation and use.

Figure 6:
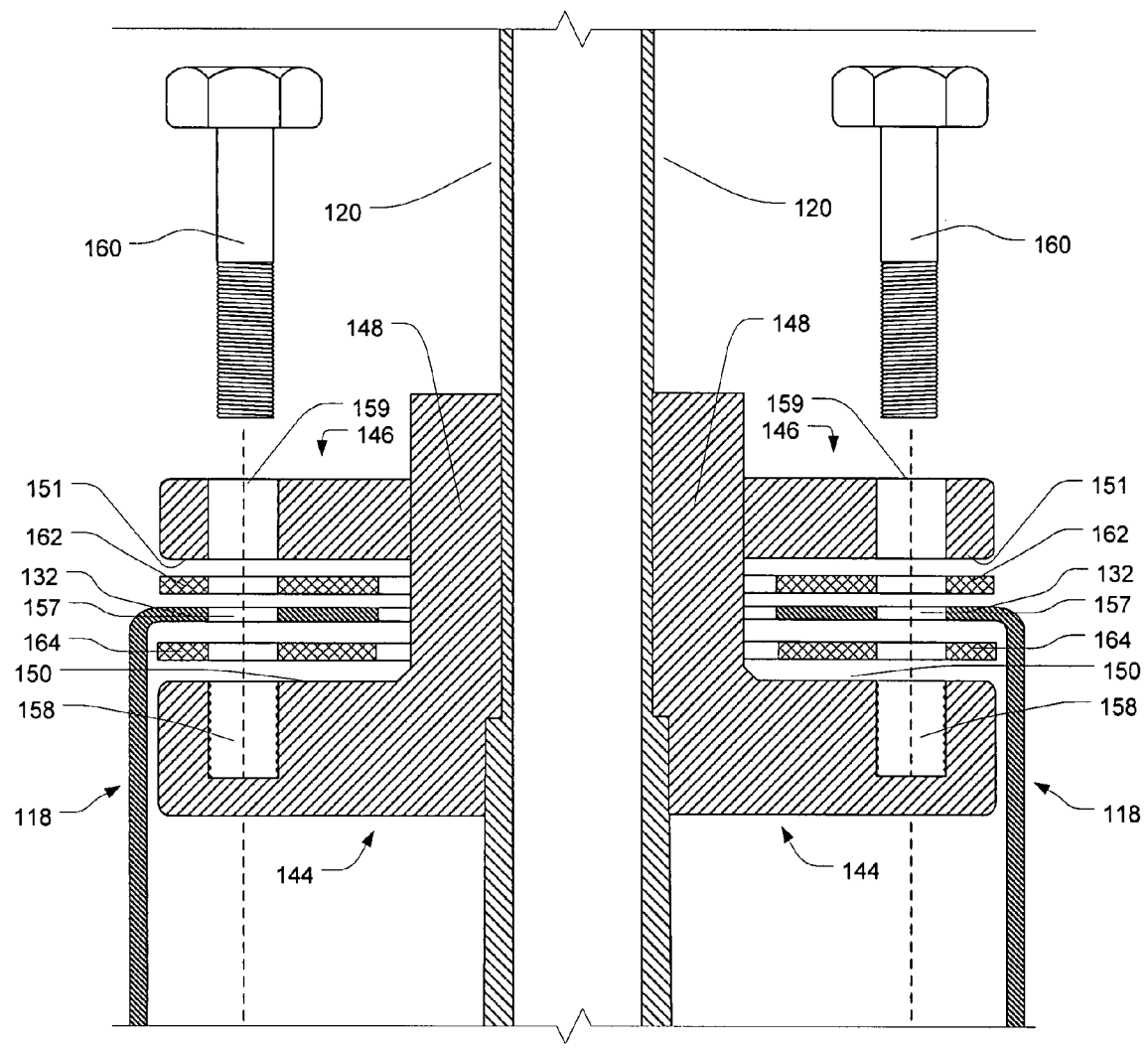
FIG. 6 is a side cross-sectional exploded view of a second preferred embodiment of the fastening assembly of the seal section of FIG. 3.

Turning now to FIG. 6, shown therein is a second preferred embodiment wherein the first ring fastening bores 158 extend only partially into the first ring 144. In this alternate embodiment, the plurality of first ring fastening bores 158 are preferably threaded for receiving and securing the plurality of fastening members 160. The second ring 146 is sized to slide over the central hub 148 of the first ring 144 and includes second ring fastening bores 159 that extend through the second ring 146. In the alternate embodiment shown in FIG. 6, the first ring 144 is inserted through the first end aperture 136 into the interior of the seal bag 118 and the second ring 146 is configured to contact the exterior surface of the first end 132 of the seal bag 118. Although not shown in the alternate embodiment of FIG. 6, it may be desirable to use dowel pins 164 to aid in the alignment of components within the fastening assembly 122.

Figure 8:
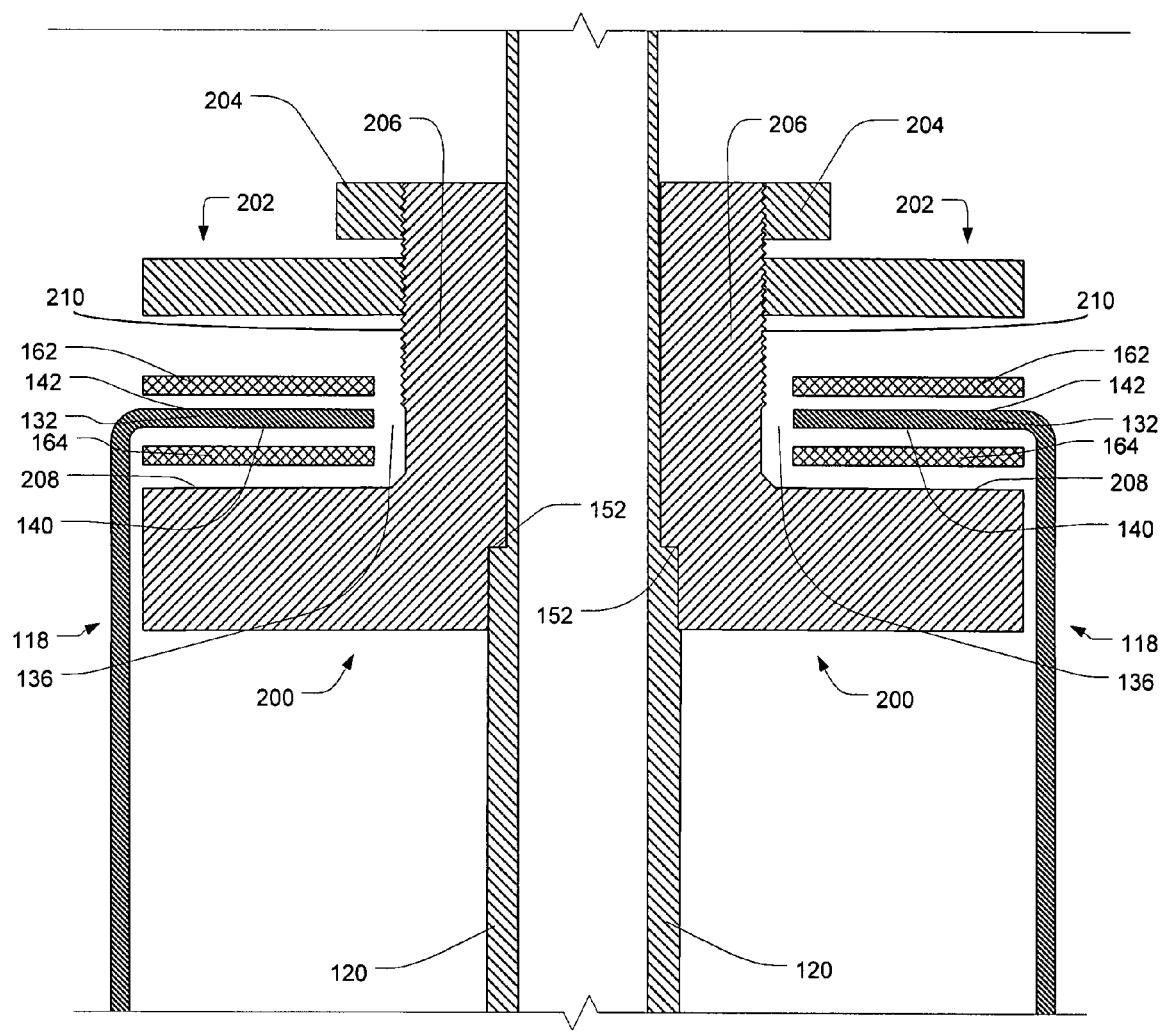
FIG. 8 is a side cross-sectional exploded view of the third preferred embodiment of the fastening assembly of the seal section of FIG. 3.

Turning to FIG. 8, shown therein is a third preferred embodiment of the bag seal assembly. In the third preferred embodiment, the fastening assembly 122 includes a compression flange 200, a compression nut 202 and a locking nut 204. The compression flange 200 is preferably configured with cylindrical geometry and includes a central hub 206 and a flat load surface 208 extending radially from the central hub 206. In the preferred embodiment shown in FIG. 8, the compression flange 200 is preferably configured to slide over the support tube 120. The compression flange 200 is fixed in position at a desired location along the support tube 120 through engagement with a shoulder 152 on the support tube 120. Alternatively, the compression flange 200 and support tube 120 can be fitted with mating threads to enable a screw-type engagement between the compression flange 200 and support tube 120.

The locking nut 204; compression nut 202 and compression flange 200 each include mating threads 210 that enable a threaded engagement between the compression nut 202, the compression flange 200 and the locking nut 204. The compression nut 202 is sized and configured to provide a compressive load onto the load surface 208 of the compression flange 200. The locking nut 204 is configured for installation screwing engagement along mating threads 210 to capture the compression nut 202 in a fixed position relative the compression flange 200. The locking nut 204 is particularly useful when excessive vibrations in the downhole environment cause the compression nut 202 to rotate and loosen about the compression flange 200.

In a preferred method of installation, the compression flange 200 is inserted into the interior of the seal bag 118 through the first end aperture 136. The load surface 208 of the compression flange 200 is placed in contact with the inner surface 140 of the first end 132 of the seal bag 118. The compression flange 200 and seal bag 118 are then moved into position over the support tube 120. Alternatively, the support tube 120 is inserted through the central hub 206 of the compression flange 200.

Once the compression flange 200 and seal bag 118 are positioned over the support tube 120, the compression nut 202 can be tightened onto the compression flange 200. As the compression nut 202 is tightened and brought into contact with the outer surface 142 of the first end 132 of the seal bag 118, the compression flange 200 and compression nut 202 cooperatively exert a compressive force on the first end 132 of the seal bag 118. When the appropriate compressive force is loaded onto the first end 132 of the seal bag 118, the locking nut 204 can be engaged along the mating threads 210 to a position adjacent the compression nut 202. In this position, the locking nut 204 secures the compression nut 202 at a fixed position relative the compression flange 200 at a fixed compressive load. The compression flange 200 and compression nut 202 are intended to provide a substantially uniform distribution of force across the first end 132 of the seal bag 118 that provides an effective seal between the interior and exterior of the seal bag 118. Once the first end 132 of the seal bag 118 has been secured with the compression assembly 122, the second end 134 is secured following the same process.

The fastening assemblies 122 additionally include an outer gasket 162 disposed between the compression nut 202 and the outer surface 142 of the seal bag 118. The fastening assemblies 122 may further include an inner gasket 164 disposed between the compression flange 200 and the inner surface 140 of the seal bag 118. The outer gasket 162 and inner gasket 164 may improve the distribution of compressive force and sealing effect between the first and second ends 132, 134 of the seal bag 118.

As shown in FIGS. 5, 6, 7, 8 and 9, the fastening assemblies 122 may also include an outer gasket 162 disposed between the first ring 144 and the first end 132. The fastening assemblies 122 may further include an inner gasket 164 disposed between the second ring 146 and first end 132. The outer gasket 162 and inner gasket 164 may improve the distribution of compressive force and sealing effect between the first and second ends 132, 134 of the seal bag 118.

Figure 7:
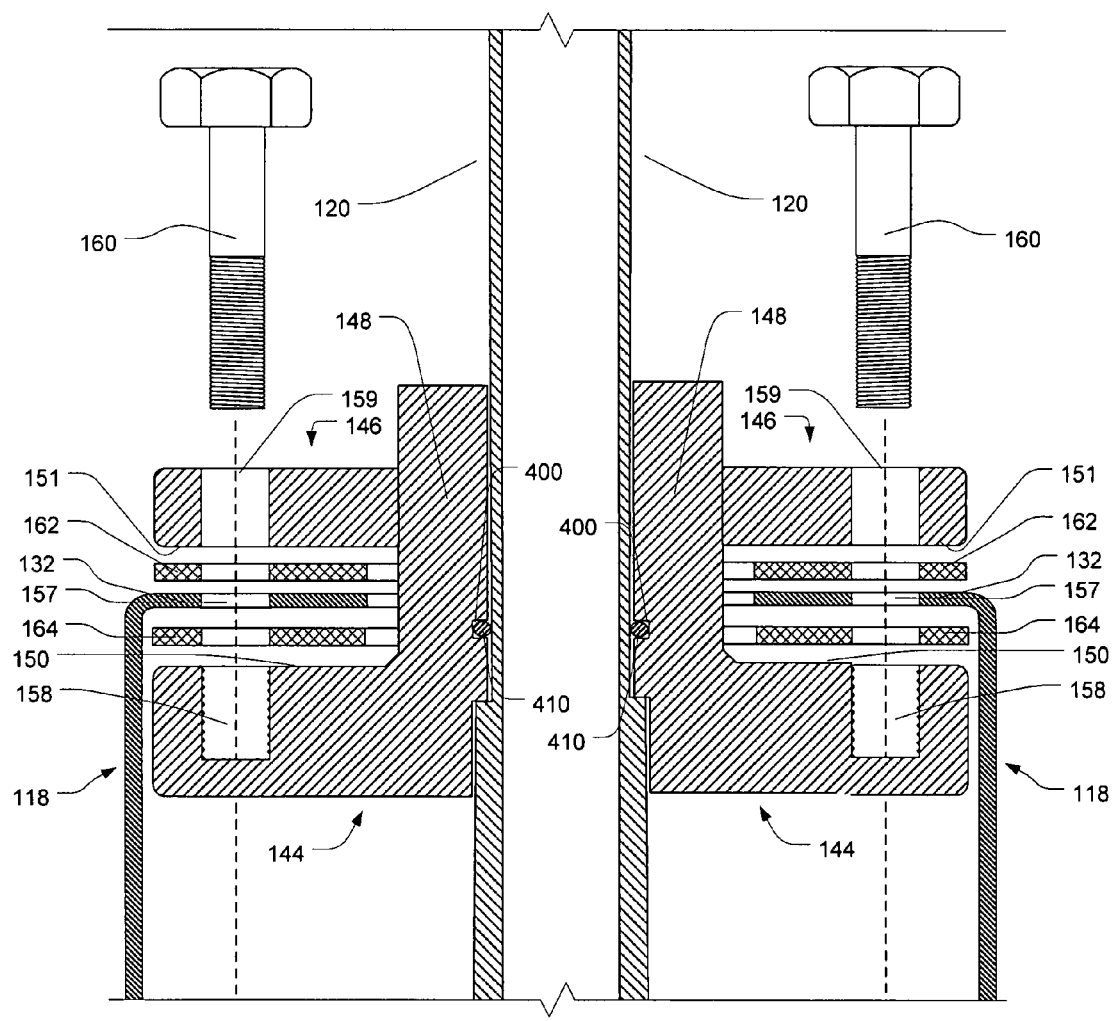
FIG. 7 is a side cross-sectional exploded view of the second preferred embodiment of the fastening assembly of seal section of FIG. 3, wherein an optional o-ring seal is depicted.

As shown in FIG. 7, the fastening assemblies 122 may optionally include an o-ring groove 400 and an o-ring seal 410. The o-ring groove 400 is a void that extends circumferentially around the interior surface of the central hub 148. The o-ring seal 410 is preferably manufactured of some electrometric material, and is configured to fit snugly within the o-ring groove 400. When used, the o-ring seal permits the fastening assembly 122 to travel vertically up and down the support tube 120. It will be understood that while the o-ring seal 410 and o-ring groove 400 are depicted within FIG. 7, they can be included in the fastening assemblies 122 of the preferred embodiments depicted in FIGS. 5, 6, 8, 9 and 10.

Figure 10:
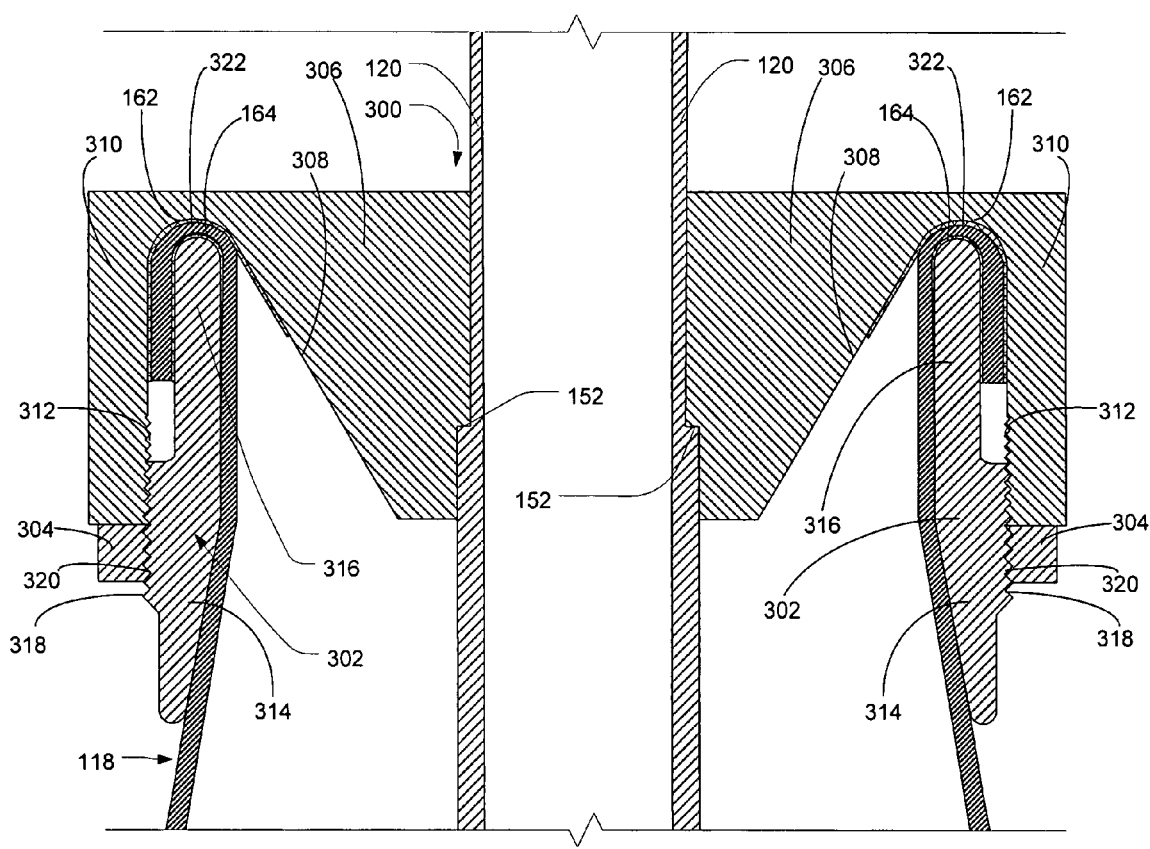
FIG. 10 is a side cross-sectional view of a fourth preferred embodiment of the fastening assembly of the seal section of FIG. 3.

Turning to FIG. 10, therein in depicted is a fourth preferred embodiment of the bag seal assembly, which includes a receiving ring 300, an insertion ring 302 and a locking ring 304. The receiving ring 300 preferably includes a central hub 306 fixedly attached to the support tube 120. In a particularly preferred embodiment, the receiving ring 300 is secured to the central hub 306 through engagement with a shoulder 152 on the support tube 120. Alternatively, the receiving ring 300 and support tube 120 can be fitted with mating threads to enable a screw-type engagement between the receiving ring 300 and support tube 120. The receiving ring 300 includes a circumferential detent 308 formed between the central hub 306 and an outer wall 310. The receiving ring includes internal threads 312 along at least a portion of the outer wall 310.

The insertion ring 302 preferably includes a base 314 and a contact member 316 extending from the base. The base 314 includes external threads 318 that are configured for engagement with the internal threads 312 on the outer wall 310 of the receiving ring 300. The contact member 316 is configured for extension into the circumferential detent 308 of the receiving ring 300 when the insertion ring 302 is engaged with the receiving ring 300.

The locking ring 304 includes locking ring threads 320 that are configured for threaded engagement with the external threads 318 of the insertion ring 302. When engaged, the locking ring 304 secures the insertion ring 302 in a fixed position relative to the receiving ring 300.

Figure 11:
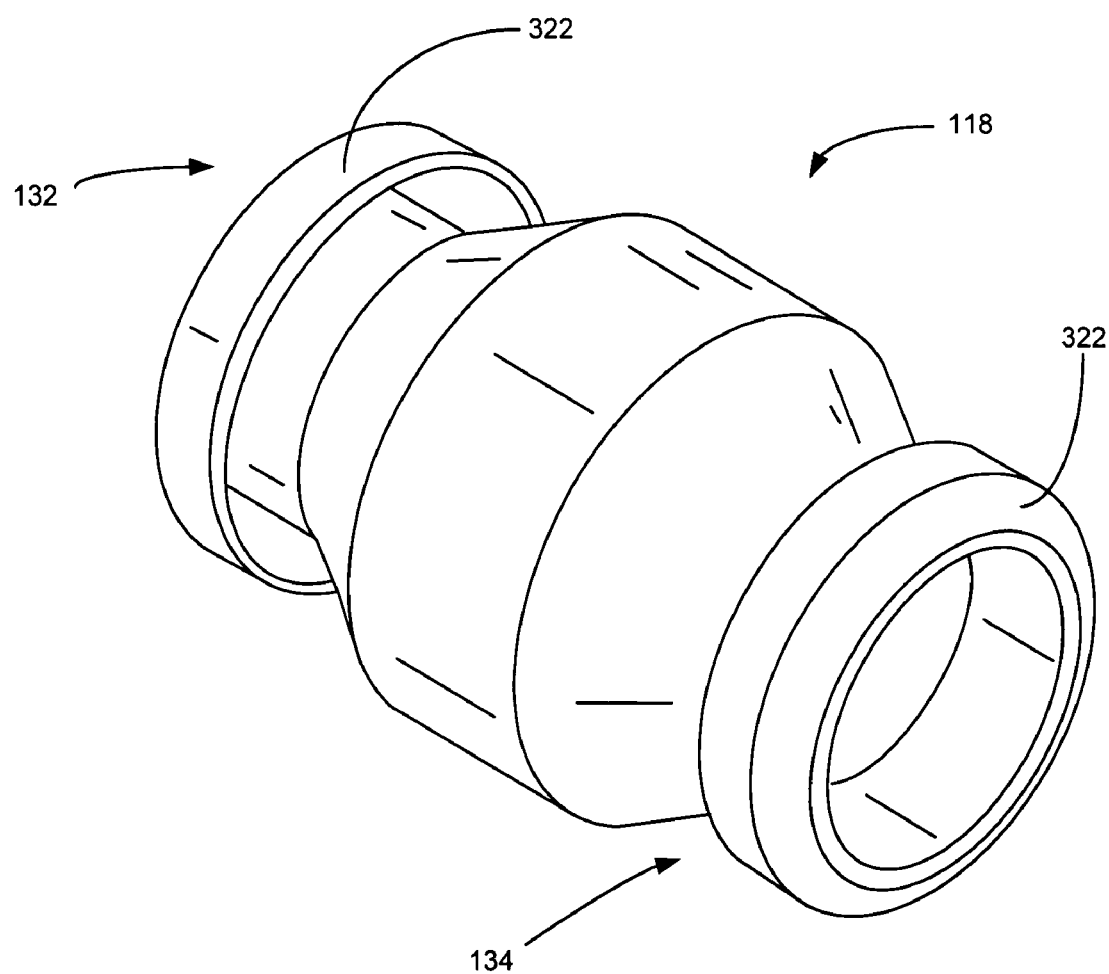
FIG. 11 is a perspective view of the seal bag of FIG. 10.

As shown in FIGS. 10 and 11, the first end 132 and second end 134 of the seal bag 118 has been partially rolled to form a flared end 322. During use, the contact member 316 of the insertion ring 302 is placed inside the flared end 322 of the seal bag 118. The insertion ring 302 is then threadingly engaged with the receiving ring 300. As the insertion ring 302 is engaged with the receiving ring 300, the contact member 316 captures the flared end 322 of the seal bag 118 within the circumferential detent 308. When the appropriate amount of compression is placed on the flared end 322 by the contact member 316 and circumferential detent 308, the locking ring 304 is threaded onto the external threads 318 to fix the insertion ring 302 into position relative the receiving ring 300.

The fastening assemblies 122 in the preferred embodiments shown in FIG. 10 may additionally include an outer gasket 162 disposed between the flared end 322 and the circumferential detent 308 and an inner gasket 164 between flared end 322 and the contact member 316. The outer gasket 162 and inner gasket 164 may improve the distribution of compressive force and sealing effect between the flared end 322, the receiving ring 300 and the insertion ring 302.

Figure 9:
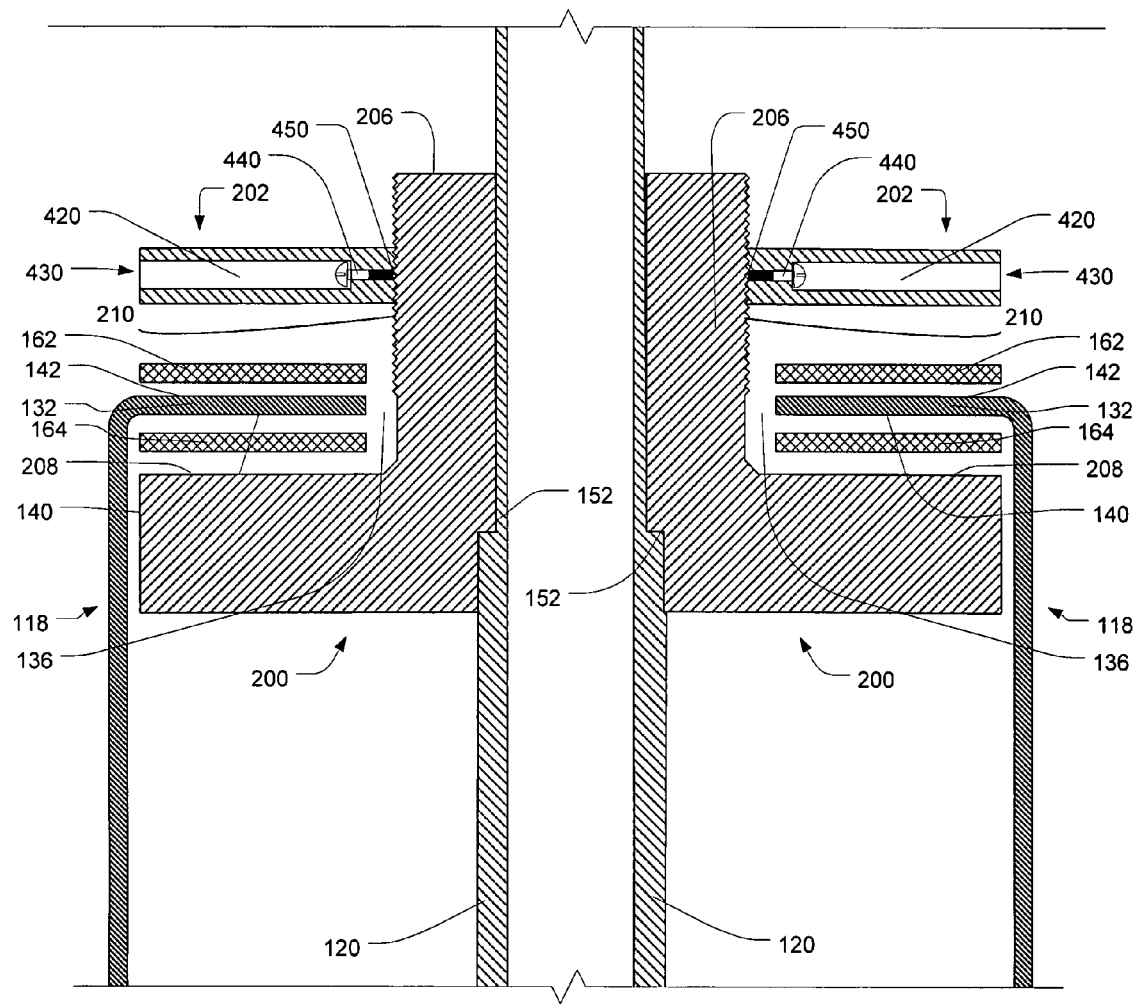
FIG. 9 is a side cross-sectional exploded view of the third preferred embodiment of the fastening assembly of the seal section of FIG. 3, wherein an optional compression nut configuration is depicted.

In yet another alternative embodiment, the locking function of the locking nut 204 depicted in FIG. 8 can be accomplished by including a locking bore 420 and a thread locking screw 440 within the compression nut 202, as depicted in FIG. 9. In this embodiment, the locking bore 420 is a hole extending horizontally through the compression nut 202. The locking bore 420 includes an outer locking bore opening 430 and an inner locking bore opening 450. The outer locking bore opening 430 is located on the outer circumference of the compression nut 202 and the inner locking bore opening 450 is located on the inner circumference of the compression nut 202. The inner locking bore opening 450 is generally narrower than the outer locking bore opening 430.

In this alternative embodiment, the compression nut is threadably engaged to the central hub 206, and is rotated into its compressive position. Once the compression nut 202 is properly positioned, the thread locking screw 440 is inserted into the locking bore 420 through the outer locking bore opening 430. The thread locking screw 440 is then inserted into the inner locking bore opening 450, where it threadably engages with the inner locking bore opening 450. It will be understood that as the thread locking screw 440 is rotated within the inner locking bore opening 450, the thread locking screw 440 will eventually contact the central hub 206. It will be further understood that by continuing to rotate the thread locking screw 440 after such contact has been made with the central hub 206, pressure will be applied to the threads on the central hub 206 thereby deforming the threads and preventing any vertical movement of the compression nut 202 relative to the central hub 206.

It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention.

For example, it will be understood that while FIG. 3 depicts the seal section 112 making use of two similar embodiments of the bag seal assembly, different embodiments of the invention may be paired together to meet specific application needs, e.g., the preferred embodiment depicted in FIG. 5 can be paired with the alternate embodiment depicted in FIG. 6, FIG. 7, FIG. 8, FIG. 9 or FIG. 10 within the same seal section 112.

Additionally, it will be understood that other mechanisms for securing the first ring 144 to the support tube 120 are contemplated by the present invention, including but not limited to: adhesives, welds, screws, bolts, rivets or dowels. Alternatively it may be desirable to make use of snap rings or press fittings to lock the first ring 144 at a selected position along the support tube 120. It will understood that there are alternative methods of creating a proper seal between the first ring 144, the seal bag 118 and the second 146 without the use of compression. Such methods may include the use of adhesive substances or by a fusion of materials. These alternative sealing methods may be used in place of or in conjunction with the compression method used in the preferred embodiments.

What is claimed is:

1. A bag seal assembly for use in a downhole submersible pumping system, the bag seal assembly comprising:
    a seal bag, wherein the seal bag includes:
    a first end;
    a second end; and
    wherein each of the first end and second end includes:
        a first surface;
        a second surface; and
        a plurality of fastening holes;
    a bag support tube extending through the seal bag, wherein the bag support tube is capable of housing a shaft that extends through the bag assembly;
    a first and second fastening assembly, wherein the first fastening assembly, and second fastening assembly are each used to secure a corresponding one of the first end and the second end of the seal bag, and wherein each of the first fastening assembly and the second fastening assembly includes:
        a first ring positioned over the bag support tube and adjacent to the first surface and having a plurality of first ring fastening bores extending through the first ring, wherein the plurality of first ring fastening bores are aligned with the plurality of fastening holes;
        a second ring engaged positioned over the bag support tube and adjacent to the second surface and having a plurality of second ring fastening bores extending at least partially through the second ring, wherein the plurality second ring fastening bores are aligned with the plurality of fastening holes;
    a plurality of fastening members positioned within the plurality of fastening holes, the plurality of first ring fastening bores and the plurality of second ring fastening bores;
    a first gasket positioned between the first ring and the first surface;
    a second gasket positioned between the second ring and the second surface;
    a plurality of dowel pins connected to both the first and second ring; and
    a plurality of locking fasteners, wherein each of the plurality of locking fasteners is engaged with a corresponding fastening member; and
    wherein the bag support tube further includes a shoulder and the engagement of the first ring of the fastening assembly on the support tube is limited by contact between the first ring and the shoulder.

2. The bag seal assembly of claim 1, wherein the first ring and second ring apply a compressive force to the first end.

3. The bag seal assembly of claim 1, wherein the first surface is an outer surface.

4. The bag seal assembly of claim 1, wherein the first surface is an inner surface.

5. The bag seal assembly of claim 1, wherein the dowel pins prevent the second ring from rotating relative to the first ring.

6. The bag seal assembly of claim 5, wherein the dowel pins pass through at least one of the plurality of fastening holes.

7. A bag seal assembly for use in a downhole submersible pumping system, the bag seal assembly comprising:
    a seal bag, wherein the seal bag includes:
    a first end;

a second end; and
wherein each of the first end and second end includes:
- a first surface;
- a second surface; and
- a plurality of fastening holes;

a bag support tube extending through the seal bag, wherein the bag support tube is capable of housing a shaft that extends through the bag assembly;

a first and second fastening assembly, wherein the first fastening assembly, and second fastening assembly are each used to secure a corresponding one of the first end and the second end of the seal bag, and wherein each of the first fastening assembly and the second fastening assembly includes:
- a first ring positioned over the bag support tube and adjacent to the first surface and having a plurality of first ring fastening bores extending through the first ring, wherein the plurality of first ring fastening bores are aligned with the plurality of fastening holes;
- a second ring engaged positioned over the bag support tube and adjacent to the second surface and having a plurality of second ring fastening bores extending at least partially through the second ring, wherein the plurality second ring fastening bores are aligned with the plurality of fastening holes;
- a plurality of fastening members positioned within the plurality of fastening holes, the plurality of first ring fastening bores and the plurality of second ring fastening bores; wherein the plurality of fastening members are threadably engaged with the second ring;
- a first gasket positioned between the first ring and the first surface;
- a second gasket positioned between the second ring and the second surface; and
- a plurality of dowel pins connected to both the first and second ring; and
wherein the bag support tube further includes a shoulder and the engagement of the first ring of the fastening assembly on the support tube is limited by contact between the first ring and the shoulder.

8. The bag seal assembly of claim 7, wherein the first ring and second ring apply a compressive force to the first end.

9. The bag seal assembly of claim 7, wherein the first surface is an outer surface.

10. The bag seal assembly of claim 7, wherein the first surface is an inner surface.

11. The bag seal assembly of claim 7, wherein the dowel pins prevent the second ring from rotating relative to the first ring.

12. The bag seal assembly of claim 11, wherein the dowel pins pass through at least one of the plurality of fastening holes.

* * * * *